United States Patent Office 2,761,868
Patented Sept. 4, 1956

2,761,868

SULFONATED AND UNSULFONATED IMIDO-METHYL, CARBOXYAMIDOMETHYL AND AMINOMETHYL PHTHALOCYANINES

Harold T. Lacey, Westfield, N. J., assignor to American Cyanamid Company, New York, N. Y., a corporation of Maine No Drawing. Application May 13, 1953,
Serial No. 354,897

17 Claims. (Cl. 260—314.5)

This invention relates to new coloring matters of the phthalocyanine series of the formula:

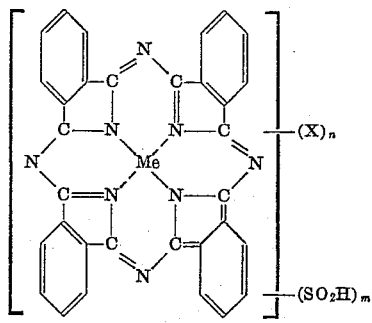

in which Me represents two atoms of hydrogen or one atom of a divalent metal, such as copper, iron, zinc, nickel, cobalt and tin, having a coordination number of 4–6, X represents the group—$CH_2NH_2$

—$CH_2NHCORCOOH$ or

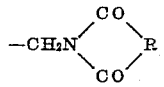

wherein R is a 1,2-divalent radical, and in which $n$ and $m$ are integers, the sum of which is less than 9. Other hydrogen atoms on the benzo groups may be replaced by halogen. The total number of substituents is a maximum of 8.

The imidomethyl and o-carboxyamidomethyl phthalocyanine derivatives of the present invention, not only constitute a novel series of phthalocyanine pigments of great beauty and permanence of shade but have also proved of great value as intermediates in the preparation of dyestuffs and oil and spirit-soluble colorants. The aminomethyl phthalocyanine derivatives of the present invention are valuable dyes for natural fibers such as wool, cotton and silk as well as for synthetic fibers such as viscose rayon, cellulose acetate, polyamide and polyacrylonitrile types. The aminomethyl groups of the substituted phthalocyanine confer properties of substantivity to the phthalocyanine so as to make the substituted phthalocyanine usable in dyeing and printing applications. Thus, these latter compounds dye fibers brilliant blue to greenish blue shades of good permanence that are fast to crocking, fast to washing and fast to light. These compounds may also be used as intermediates for other dyestuffs to be applied to various fibers and for oil-soluble colors.

It is to be observed that the present novel phthalocyanine derivatives may also contain sulfonic acid groups in addition to the imidomethyl, carboxyamidomethyl, or aminomethyl substituents. These latter compounds have important properties not possessed by phthalocyanines containing only sulfonic acid groups or imidomethyl, carboxyamidomethyl or aminomethyl groups. That is to say, the sulfates of these latter compounds show an increased solubility, which permits their use in dye baths containing sulfate ions. Moreover, the sulfonic acid groups confer solubility to the phthalocyanine so as to make the substituted phthalocyanine usable as a direct dye.

In carrying out the present invention, the novel compounds can be prepared either stepwise or in one operation. The stepwise preparation can be carried out by introduction of the sulfonic acid group, followed by the imidomethyl group, or the imidomethyl group can be introduced first followed by the sulfonic acid group if desired. If the sulfonated phthalocyanine is reacted with a suitable imide and paraformaldehyde, the product may contain some imido rings intact depending upon the strength and temperature of the acid used for the condensation. The same result is achieved when an unsulfonated phthalocyanine is used and since the condensation permits some imido rings to come through the reaction intact, the separate step is a preferred method when such a product is desired. If the sulfonation is carried out after the imidomethyl group is introduced the product is principally a sulfonic acid derivative of the o-carboxyamidomethyl phthalocyanine. The same result is obtained from carrying out both reactions in one operation as more particularly hereinafter described.

The imidomethyl substituted phthalocyanines of the present invention may be prepared by reacting phthalocyanines with hydroxymethylimides of the formula

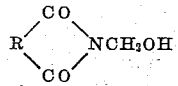

in which R is a 1,2-divalent radical, or with reagents which produce the hydroxymethylimides under the acidic, substantially anhydrous conditions of the reaction. Such reagents are formaldehyde producing substances such as paraformaldehyde and the corresponding dicarboxylic acid imide. This also includes imidomethyl ethers of the formula

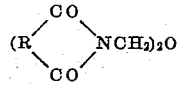

in which R has the same meaning as above. In the preferred modification of the invention, R is an orthophenylene radical.

As stated above, the reaction is carried out under substantially anhydrous acidic conditions. Dehydrating acids such as concentrated sulfuric acid and syrupy phosphoric acid are suitable reaction media. If desired, dehydrating agents such as oleum, acetic anhydride, phosphorus pentoxide and the like may be added, and are especially desirable where a larger number of imidomethyl groups are to be introduced. The amount of additional dehydrating agent is not critical but should normally be sufficient to react with the additional molecules of water formed by the condensation. Higher temperatures and longer reaction times also favor the production of compounds with more than one substituent. In general, there will be produced mixtures having various numbers of substituents.

The imidomethyl substituents

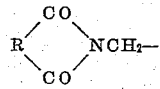

are probably introduced first; some of these may be partially hydrolyzed under the conditions of the reaction, to the half acid amide, —$CH_2$—$NH$—$CO$—$R$—$COOH$.

The mechanism of this reaction is not certain, however, and it is not desired to limit the present invention to any particular theory.

These partially hydrolyzed derivatives, being o-carboxyamides, show properties very similar to the imido derivatives when only one or two free carboxy groups per phthalocyanine molecule are present, but when three or more free carboxy groups are present, they show solubility in aqueous alkalies, and thus open new and valuable posibilities for the utilization of phthalocyanine products in the field of colorants.

It is to be noted that compounds containing both the imido and the o-carboxy amido groupings in the same molecule are formed by the present process and are included in the scope of the invention.

A definite control can be provided in the condensation reaction for obtaining larger or smaller quantities of the half-hydrolyzed o-carboxyamidomethyl groupings. If a minimum of hydrolysis is desired, lower temperatures and stronger dehydrating conditions are employed; such as fuming sulfuric acid, or sulfuric acid containing free phosphorus pentoxide, or acetic anhydride, at temperatures not exceeding 80° C. If greater conversion to the carboxy amide is desired, preferably a weaker acid, such as 98% sulfuric, is used and the temperature is raised above 100° C. Complete conversion of all imido groups to ortho carboxy amido groups can be obtained by boiling the condensation product in alkaline aqueous solutions, such as aqueous sodium carbonate or dilute sodium hydroxide solutions. Both types of compounds or mixtures thereof may be hydrolyzed further, as more particularly hereinafter described, to form aminomethylphthalocyanines.

Imides of 1,2-dicarboxylic acids are generally applicable in the imidomethylation reaction, either as N-methylol derivatives or in conjunction with a formaldehyde source; the precise form of the starting material being chosen as a matter of convenience, as described above. Usable imides include succinimide, glutarimide, beta-beta-dimethylglutarimide, alpha-alpha'-dimethylsuccinimide, maleic imide, methylmaleic imide, phenylsuccinimide and the like. Excellent results, in particular, are given by compounds of the phthalic acid series, such as phthalimide, tetrahydrophthalimide, 4-chlorophthalimide, 3,5-dichlorophthalimide, 4-nitrophthalimide and the like.

As stated hereinbefore, when sulfonated products are desired, the novel compounds of the present invention can be prepared in one operation as well as stepwise. When an amidomethyl derivative or an aminomethyl derivative of a sulfonated phthalocyanine is desired, the preparation in one operation is the more economical. Because the imidomethyl group goes into the ring under milder conditions than are necessary to permit suufonation, it is believed that this condensation always takes place first even when sulfonation conditions are used. In preparing the compounds of the present invention in a single operation, the reaction is controlled by the relative amounts of the reactants and by the balance of the three variables; time, temperature and the concentration of the acid. For example, in 100% sulfuric acid, initial imidomethylation of copper phthalocyanine occurs at approximately 50° C. while initial sulfonation occurs at 100° C. By using a higher temperature, a longer time or both, larger numbers of each group can be added. The time and temperature of such an introduction can be reduced by the use of stronger oleum. When no sulfonation is desired, the oleum used is usually calculated to contain just enough sulfur trioxide to react with the by-product water being produced. The number of each group desired is governed by a balance of the solubilizing action conferred by the sulfonic acid groups and of the substantivity conferred by the aminomethyl groups, which are the hydrolysis products of the o-carboxyamidomethyl groups.

The steps involved in the hydrolysis of the imidomethyl and o-carboxyamidomethyl groups to aminomethyl groups may be represented by the following equations, although the invention is not limited to this precise mechanism:

(I) 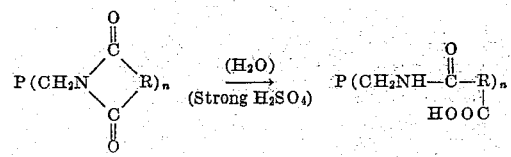

(II) 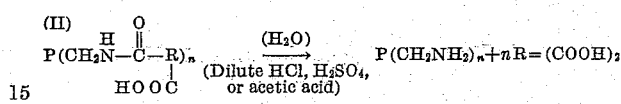

in which P represents the phthalocyanine nucleus, R has the meaning defined above, and $n$ represents a positive integer less than 9.

Step I above represents the mechanism by which the o-carboxyamidomethyl phthalocyanine derivatives may be prepared, and Step II above represents the further hydrolysis thereof to form the aminomethyl compounds.

The hydrolysis of the imidomethyl groups to the ortho-carboxyamidomethyl groups, represented by Equation I, above, can be accomplished easily and in good yields by heating with concentrated sulfuric acid. The hydrolysis may be carried out in sulfuric acid, varying in strength from approximately 90% to 100%, and at temperatures varying from as low as aproximately 75° C. for the higher concentration acid, to as high as 140° C. for the 90% acid. Higher concentrations of sulfuric acid and higher temperatures are less desirable.

Step II of the hydrolysis, that is, the conversion of the ortho-carboxyamidomethyl to the aminomethyl group, can be brought about in a number of ways, but the preferred procedure involves boiling with dilute mineral or organic acids. In this step, it has been found advantageous first to dissolve the ortho-carboxyamidomethyl derivatives in dilute alkali and then add the acid slowly to the boiling alkaline solution. The unhydrolyzed product is first precipitated in a gelatinous form and then, as boiling of the dilute acid suspension continues, the product goes into solution, indicating hydrolysis to the soluble acid salt of the aminomethyl derivative. Sulfates and oxalates of the aminomethyl derivatives are only very slightly soluble and therefore dilute sulfuric or oxalic acids are not recommended in this procedure.

Particularly effective as hydrolyzing agents for Step II are the halogen acids, such as hydrochloric acid, hydrobromic acid; other acids can also be used, however, such as phosphoric, citric, acetic, dichloracetic, trichloracetic, etc. Oxidizing acids, such as nitric acid, are not indicated as the resulting products are sensitive to oxidation.

The aminomethyl phthalocyanine derivatives are best isolated from the hydrolyzed solution as salts with the hydrolyzing acid, e. g., as hydrochlorides by salting. If the free base is desired, this may be obtained by neutralizing the solution with an alkali metal hydroxide or with ammonia. I have observed that the aminomethyl derivatives in question appear to be susceptible to oxidation with loss of nitrogen, particularly in alkaline suspension. The reactions involved may possibly be represented by the following equation:

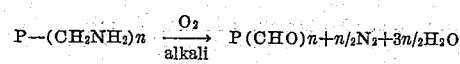

For this reason, when the free base is desired, care must be used to carry out the neutralization in the absence of air or oxygen, or an impure product may result. Generally, the aminomethyl derivatives are best isolated and stored as the hydrohalide salts which are completely stable and water soluble. Since they may be used in this form for application to the fiber, this constitutes a preferred procedure.

When the products are to be used as pigments and not for further reaction to make the novel dyes as described hereinbefore, the pigments may be improved by treatments which have been used with unsubstituted phthalocyanines. If a particularly soft and easily ground pigment product is desired, it is found advantageous to drown the reaction mixture in the presence of xylene sulfonic acid or a similar reagent. This can readily be done by adding xylene or other alkylated aromatic hydrocarbon to the sulfuric acid solution before drowning, according to the procedure described in U. S. Patent No. 2,375,120 to Loukomsky and Lacey, issued May 1, 1945. The hydrocarbon is sulfonated in situ and has the effect of improving the pigmentary properties of the products, which have the pure blue shades characteristic of phthalocyanines, turning somewhat greener with higher degrees of substitution.

The phthalocyanines which can be used in the preparation of the novel compounds of the present invention can be either the metal-free phthalocyanine or the metallized pigments containing copper, cobalt, nickel, iron, zinc, tin or other metals of a coordination number of 4–6. The phthalocyanines may also be substituted by chlorine or bromine, in which case greener shades of blue are obtained.

The invention will be described in greater detail in conjunction with the following specific examples in which the parts are by weight unless otherwise specified. For convenience, in the formulas given, P represents the phthalocyanine nucleus.

EXAMPLE 1

*Mono-substitution, phthalimide and paraformaldehyde*

20 parts of copper phthalocyanine is added to 280 parts of 95% sulfuric acid, the temperature being kept at 50–55° C. There is then added 10.5 parts of paraformaldehyde, followed by 30.5 parts of phthalimide. After the reaction is complete, the mixture is drowned in 1000 parts of ice water and the product filtered. It may be purified by slurrying in acetone, filtering and washing. The mono-(phthalimidomethyl) copper phthalocyanine so formed is a bright blue color, and is obtained in exceedingly high yield.

EXAMPLE 2

*Mono-substitution, bis-phthalimidomethyl ether*

5 parts of copper phthalocyanine is stirred into 70 parts of 100% sulfuric acid at a temperature of 50–55° C. When solution is complete, there is added 7.85 parts of bis-phthalimidomethyl ether. The reaction is completed by heating at 70–75° C. and the solution is drowned in 500 parts of ice water. The product is filtered, washed acid free, slurried in acetone and filtered. A very good yield of mono-(phthalimidomethyl) copper phthalocyanine is obtained.

EXAMPLE 3

*Di-substitution*

10 parts of copper phthalocyanine is dusted into 140 parts of 100% sulfuric acid at 50–55° C., followed by 15.25 parts of phthalimide and 5.5 parts of paraformaldehyde. The mixture is heated to 70–75 C. and maintained at this temperature until the reaction is complete. The product is isolated by drowning, filtration and washing. The yield of di-(phthalimidomethyl) copper phthalocyanine is excellent. Similar results are obtained if the phthalimide and paraformaldehyde are replaced by 18.3 parts of N-hydroxymethylphthalimide.

EXAMPLE 4

*Reaction in phosphoric acid*

To 75 parts of 85% phosphoric acid, there is slowly added 65 parts of phosphorus pentoxide, the temperature being maintained at 40–45° C. When solution is complete, the temperature is raised to 50–55° C. and there is introduced 10 parts of copper phthalocyanine, followed by 37.5 parts of N-hydroxymethylphthalimide. The thick, dark green mixture is heated to 70–75° C. and stirred at this temperature until the reaction is complete. It is then drowned in 1000 parts of ice water and filtered. The product is washed acid free, slurried in acetone, filtered and dried at 60–65° C. A good yield of di-substitution product is obtained. If the above reaction is carried out with 70 parts of 85% phosphoric acid and 80 parts of phosphorus pentoxide, there is obtained an excellent yield of tri-substitution product.

EXAMPLE 5

*Tri-substitution, phthalimide, formaldehyde, and P₂O₅*

At a temperature of 50–55° C., there is added to 140 parts of 100% sulfuric acid, 10.0 parts of copper phthalocyanine, followed by 5.0 parts of phosphorus pentoxide, 15.25 parts of phthalimide and 5.5 parts of paraformaldehyde. The temperature is then raised to 70–75° C. and maintained at this temperature until the reaction is complete. The solution is drowned in 1000 parts of ice water, stirred thoroughly and filtered. The product is washed acid free, slurried in acetone and again filtered. The yield of tri-substitution product is very high.

EXAMPLE 6

*Tri-substitution, phthalimide, paraformaldehyde, and oleum*

There is added to 140 parts of 100% sulfuric acid, at a temperature of 50–55° C., 10.0 parts of copper phthalocyanine, followed by 28.3 parts of 30% oleum, 15.25 parts of phthalimide and 5.5 parts of paraformaldehyde. The mixture is heated at 70–75° C. until the reaction is complete and then drowned in 1000 parts of ice water. The product is filtered, washed acid free, slurried in acetone and filtered. The yield of the tri-substitution product is excellent.

EXAMPLE 7

*Tetra-substitution, $H_2SO_4$ and $P_2O_5$*

A mixture of 100 parts of copper phthalocyanine, 50 parts of phosphorus pentoxide and 187.5 parts of N-hydroxymethylphthalimide in 1400 parts of 100% sulfuric acid is stirred at 70–75° C. to complete the reaction, and then the temperature is raised to 100° C. for ½ hour. The mixture is then drowned in ice water. An excellent yield of tetra-substitution product is obtained. The analysis and properties correspond to the tetra-o-carboxybenzamidomethyl copper phthalocyanine.

EXAMPLE 8

*Tetra-substitution, phthalimide, paraformaldehyde, and oleum*

There is added to 140 parts of 100% sulfuric acid, at a temperature of 50–55° C., 10.0 parts of copper phthalocyanine, 56.6 parts of 30% oleum, 30.5 parts of phthalimide and 11 parts of paraformaldehyde. The temperature is then raised to 70–75° C. After the reaction is complete, the product is drowned, filtered and washed in the usual manner. An excellent yield of the tetra-substitution product is obtained.

EXAMPLE 9

*Tetra-substitution, phthalimide, paraformaldehyde, and $P_2O_5$*

A mixture of 10.0 parts of copper phthalocyanine, 10.0 parts of phosphorus pentoxide, 30.5 parts of phthalimide and 11 parts of paraformaldehyde in 140 parts of 100% sulfuric acid is heated at 70–75° C. to complete the reaction. The product is then drowned in ice water, filtered, washed acid free, reslurried in acetone, filtered, washed and dried. An excellent yield of the tetra-substitution product is obtained.

EXAMPLE 10

*Tetra-substitution, N-hydroxymethylphthalimide and P₂O₅*

At a temperature of 50–55° C., 10.0 parts of copper phthalocyanine is gradually added to 140 parts of 100% sulfuric acid, followed by 5.0 parts of phosphorus pentoxide and 37.5 parts of N-hydroxymethylphthalimide. The temperature is raised to 70–75° C. and maintained there until the reaction is complete. The solution is drowned in 1000 parts of ice water, slurried and filtered. The product is washed and dried. It is purified by slurrying in benzene followed by filtration, washing and drying.

EXAMPLE 11

*Tetra-substitution, N-hydroxymethylphthalimide and acetic anhydride*

10 parts of copper phthalocyanine is dissolved in 140 parts of 100% sulfuric acid. There is then added 11.0 parts of acetic anhydride and 18.75 parts of N-hydroxymethylphthalimide. The mixture is heated at 70–75° C. to complete the reaction and then drowned in ice water. The product is filtered, washed, slurried in acetone, refiltered, washed and dried at 50–60° C.

EXAMPLE 12

*Nitrophthalimide*

10 parts of copper phthalocyanine is dissolved in 140 parts of 100% sulfuric acid at 50–55° C. There is then added, at the same temperature, 10.0 parts of phosphorus pentoxide, 20.0 parts of 4-nitrophthalimide and 5.2 parts of paraformaldehyde. The mixture is heated at 70–75° C. to complete the reaction and then drowned in 1000 parts of ice water and filtered. The product may be slurried in acetone or alcohol and filtered. An excellent yield of tetra-substitution product is obtained.

EXAMPLE 13

*Succinimide*

Following the procedure of the preceding examples, a solution is prepared from 140 parts of 95% sulfuric acid, 10.0 parts of copper phthalocyanine, 10.5 parts of succinimide and 5.2 parts of paraformaldehyde. The reaction is completed by heating at 70–75° C. The dark blue product is isolated in the usual way and analyzes as the monosuccinimidomethyl copper phthalocyanine.

EXAMPLE 14

*Metal-free phthalocyanine*

A slurry of 9.0 parts of (metal free) phthalocyanine blue and 18.85 parts of N-methylol phthalimide in 80.0 parts of phosphorus pentoxide and 70 parts of 85% phosphoric acid is heated to 70–75° C. and held at this temperature until the reaction is complete, and then drowned. The resulting greenish-blue slurry of product is filtered and the tetra-substitution product is washed with acetone.

EXAMPLE 15

*Monochloro copper phthalocyanine*

10 parts of copper monochloro phthalocyanine is dissolved at 50–55° C. in 140 parts of 100% sulfuric acid. There is then added 37.5 parts of N-hydroxymethylphthalimide. The temperature is raised to 70–75° C. and maintained there until the reaction is complete. The mixture is then drowned and filtered. The product is slurried in acetone, filtered and dried. Yield and analysis indicate a tri-substituted derivative of the monochloro copper phthalocyanine.

EXAMPLE 16

*Hexa-substitution, N-hydroxymethylphthalimide H₃PO₄-P₂O₅*

A slurry of 10 parts of copper phthalocyanine and 18.85 parts of N-hydroxymethylphthalimide in 80 parts of phosphorus pentoxide and 70 parts of 85% phosphoric acid is heated to 120–125° C. and held at this temperature to complete the reaction. The mixture is then drowned in ice water. The greenish-blue slurry is filtered, washed acid free and is then washed with acetone. The yield and analysis of the compound indicate a hexa-substituted product.

EXAMPLE 17

*Octa-substitution, N-hydroxymethylphthalimide in H₃PO₄, and P₂O₅*

When the amount of N-hydroxymethylphthalimide in Example 16 is increased to 31.5 parts, a product is obtained which analyzes as the octa-substituted product. The bluish-green material is obtained in excellent yield. A similar result is obtained when the reaction temperature is increased to 140–145° C.

EXAMPLE 18

*Tetra-(o-carboxybenzamidomethyl) copper phthalocyanine monosulfonic acid*

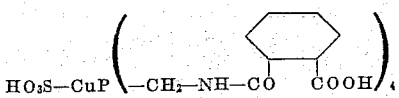

40 parts of copper phthalocyanine are added gradually to 564 parts of 10% oleum. The mixture is stirred and heated slowly to 80° C. 60 parts of methylolphthalimide are added gradually and the heating is continued until a temperature of 95–100° C. is attained. The mixture is stirred 4½ hours at this temperature and then drowned on ice and water. The product, which is filtered, is a tetra-(o-carboxybenzamidomethyl) copper phthalocyanine monosulfonic acid. Nickel or cobalt phthalocyanines react similarly.

EXAMPLE 19

*Tetra-(o-carboxybenzamidomethyl) copper phthalocyanine disulfonic acid*

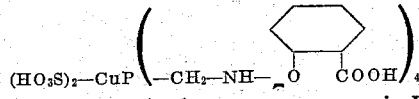

The reaction is run in the same manner as in Example 18 except that after heating 4½ hours at 95–100° C. the mixture is heated slowly to 110–120° C. and held at that temperature for one-half hour. The product is related in the same manner and is found to be approximately a tetra-(o-carboxybenzamidomethyl) copper phthalocyanine disulfonic acid. Nickel and cobalt phthalocyanines can be similarly treated to give analogous products.

EXAMPLE 20

*Tri-(o-carboxybenzamidomethyl) tetrachloro copper phthalocyanine monosulfonic acid*

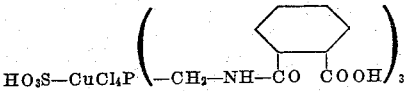

The reaction is run in the same manner as described in Example 18 except that the starting material is a molecular equivalent quantity of tetrachloro copper phthalocyanine. The product which is isolated is approximately a tri-(o-carboxybenzamidomethyl) tetrachloro copper phthalocyanine monosulfonic acid.

EXAMPLE 21

*Tetra-(o-carboxybenzamidomethyl) monochloro copper phthalocyanine monosulfonic acid*

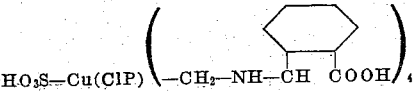

The reaction is run in the same manner as described in Example 18 except that the starting material is a molecular equivalent quantity of monochloro copper phthalocyanine. The product which is isolated is approximately a tetra-(o-carboxybenzamidomethyl) monochloro copper phthalocyanine monosulfonic acid.

EXAMPLE 22

Tetra-(o-carboxybenzamidomethyl) copper phthalocyanine tetrasulfonic acid

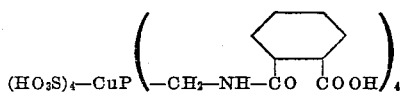

The reaction is run as described in Example 18 except that the starting material is a molecular equivalent quantity of tetrasulfo copper phthalocyanine. The product which is isolated by salting out is approximately a tetra-(o-carboxybenzamidomethyl) copper phthalocyanine tetrasulfonic acid.

EXAMPLE 23

Tetra-(o-carboxybenzamidomethyl) copper phthalocyanine disulfonic acid

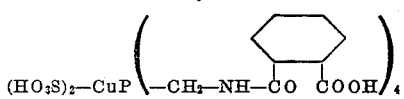

The reaction is run as described in Example 18 except that the starting material is a molecular equivalent quantity of copper phthalocyanine disulfonic acid. The product which is isolated is approximately tetra-(o-carboxybenzamidomethyl) copper phthalocyanine disulfonic acid. If the temperature is kept at 85–90° C. for 4 to 4½ hours instead of at 95–100° C. an average of only three o-carboxybenzamidomethyl groups are introduced into the molecule.

EXAMPLE 24

Di-(o-carboxybenzamidomethyl) copper phthalocyanine disulfonic acid

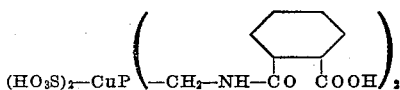

40 parts of copper phthalocyanine are added gradually to 564 parts of 10% oleum. The mixture is stirred and heated slowly to 80° C. 30 parts of methylolphthalimide are added gradually and the heating is continued until a temperature of 95–100° C. is attained. The mixture is drowned on ice and water and the product is isolated by filtration. It has the approximate composition of a di-(o-carboxybenzamidomethyl) copper phthalocyanine disulfonic acid. Nickel and cobalt phthalocyanines can be similarly treated to give analogous products.

EXAMPLE 25

Tetra-(o-carboxybenzamidomethyl) cobalt phthalocyanine monosulfonic acid

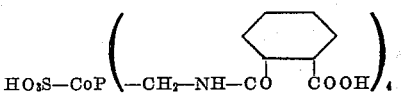

40 parts of cobalt phthalocyanine are added gradually to 564 parts of 7% oleum. The mixture is heated slowly to 80° C. 60 parts of N-methylolphthalimide are added gradually and the heating continued until a temperature of 95–100° C. is attained. The mixture is stirred 4 hours at this temperature and then drowned on ice and water. The product isolated is a tetra-(o-carboxybenzamidomethyl) cobalt phthalocyanine monosulfonic acid.

EXAMPLE 26

Tetra-(beta-carboxypropionamidomethyl) copper phthalocyanine monosulfonic acid

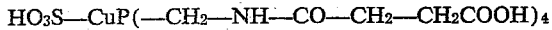

A molecular equivalent quantity (43.6 parts) of N-methylolsuccinimide is substituted for the methylolphthalimide in the procedure of Example 18. The product isolated is a tetra-(beta-carboxypropionamidomethyl) copper phthalocyanine monosulfonic acid.

EXAMPLE 27

Tetra-(2-carboxy-4-bromobenzamidomethyl) copper phthalocyanine monosulfonic acid

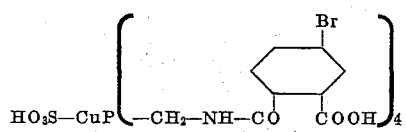

A molecular equivalent quantity (87 parts) of N-methylol-4-bromophthalimide is substituted for the N-methylol phthalimide in the procedure of Example 18. The product isolated is a tetra-(2-carboxy-4-bromobenzamidomethyl) copper phthalocyanine monosulfonic acid.

EXAMPLE 28

Tetra-(2-carboxy-4-nitrobenzamidomethyl) copper phthalocyanine monosulfonic acid

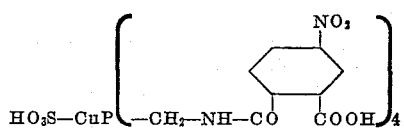

A molecular equivalent quantity (75 parts) of N-methylol-4-bromophthalimide is substituted for the N-methylol phthalimide in the procedure of Example 18. The product isolated is tetra-(2-carboxy-4-nitrobenzamidomethyl) copper phthalocyanine monosulfonic acid.

EXAMPLE 29

Tetra-(o-carboxybenzamidomethyl) copper phthalocyanine

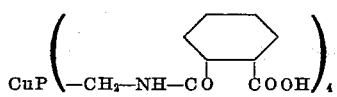

10 parts of tetra-(phthalimidomethyl) copper phthalocyanine are dissolved at 50–55° C. in 140 parts of 100% sulfuric acid, with stirring. The temperature is raised to 100° C. and held at 100° C. to complete the reaction. The hot solution is then drowned into a mixture of 500 parts of water and 500 parts of ice and the slurry is stirred for one hour. It is isolated by filtration and washing and air dried at 50–60° C. A good yield of a dark blue solid is obtained which is soluble in dilute alkaline solutions and which analyzes as the tetra-(o-carboxybenzamidomethyl) copper phthalocyanine.

EXAMPLE 30

Tetra-(aminomethyl) copper phthalocyanine tetrahydrochloride

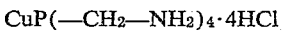

25 parts of tetra-(o-carboxybenzamidomethyl) copper phthalocyanine of Example 29 are dissolved in 2,500 parts of 0.25 N sodium hydroxide solution, and the stirred solution is heated to the boil. 850 parts of 5 N hydrochloric acid are added gradually to the solution which is held at 90–100° C. The initial precipitate is slowly redissolved as more acid is added. The product, tetra-(aminomethyl) copper phthalocyanine tetra-hydrochloride, is isolated by precipitation from the cool solution by the addition of an excess of concentrated hydrochloric acid.

EXAMPLE 31

Tri-(aminomethyl) copper phthalocyanine trihydrochloride

20 parts of tri-(o-carboxybenzamidomethyl) copper phthalocyanine, obtainable from triphthalimidomethyl copper phthalocyanine by the process of Example 29 are heated at reflux temperature for a number of hours with 100 parts of 20% hydrochloric acid solution. The reaction mixture is diluted with 1,500 parts of water and the solution is heated to boiling. The hot solution is filtered and made slightly alkaline with ammonium hydroxide. The precipitate which forms is collected by centrifuging and redissolved in dilute hydrochloric acid solution. The solution is made strongly acid with concentrated hydrochloric acid, and the precipitate is collected and dried in a vacuum oven at 50–60° C. The precipitate analyzes as tri-(aminomethyl) copper phthalocyanine trihydrochloride. The corresponding aminomethyl hydrobromide derivative is obtained by substituting 48% hydrobromic acid for the 20% hydrochloric acid.

EXAMPLE 32

*Tetra-(aminomethyl) copper phthalocyanine*

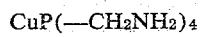

19.0 parts of tetra(2-carboxy-5-bromobenzamidomethyl) copper phthalocyanine, obtainable from tetra-(4-bromophthalimidomethyl) copper phthalocyanine by the process of Example 29 are dissolved in 500 parts of 0.5 N sodium hydroxide solution, and the solution stirred at reflux for one and one-half hours. The resulting solution is diluted to 1,500 parts with cool water and filtered. The filtrate is heated to boiling and stirred while 210 parts of 1.66 N hydrochloric acid solution are slowly added. The acid solution is stirred at the boil for two and one-half hours and then diluted to 2,000 parts with water. The resulting solution is made alkaline with ammonium hydroxide, and the precipitate is isolated by filtration and washed free of halide ion with very dilute ammonium hydroxide solution. The product, tetra-(aminomethyl) copper phthalocyanine, is essentially free of bromine, indicating completion of the hydrolysis.

EXAMPLE 33

*Tetra-(aminomethyl) copper phthalocyanine tetrahydrochloride*

2.0 parts of tetra-(o-carboxybenzamidomethyl) copper phthalocyanine are heated at 175° C. at the boil in an autoclave with 30 parts of 10% hydrochloric acid solution. The mixture is then diluted to 2,000 parts with water. Spectrophotometric analysis indicates that the hydrolysis to tetra-(aminomethyl) copper phthalocyanine tetrahydrochloride is essentially complete, and the product is isolated by salting.

EXAMPLE 34

*Tri-(aminomethyl) copper phthalocyanine trihydrochloride*

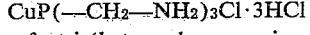

One part of tri-(beta-carboxypropionamidomethyl) copper phthalocyanine is dissolved in approximately 50 parts of 2 N sodium hydroxide and the solution heated to the boil. The solution is slowly acidified at the boil with approximately 1 N hydrochloric acid. The initially precipitated material redissolves to give a solution of tri-(aminomethyl) copper phthalocyanine trihydrochloride.

EXAMPLE 35

*Octa-(aminomethyl) copper phthalocyanine octahydrochloride*

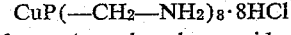

One part of octa-(o-carboxybenzamidomethyl) copper phthalocyanine, obtainable from octa-(phthalimidomethyl) copper phthalocyanine by the method of Example 29 is dissolved in 70 parts of 2 N sodium hydroxide and heated to a boil. When slowly acidified at the boil with dilute hydrochloric acid, a solution is obtained containing octa-(aminomethyl) copper phthalocyanine octahydrochloride.

EXAMPLE 36

*Tetra-(aminomethyl) phthalocyanine tetracetate*

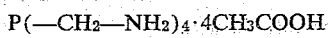

One part of tetra-(o-carboxybenzamidomethyl) metal-free phthalocyanine is dissolved in approximately 50 parts of 2 N sodium hydroxide and the solution is heated to the boil. The solution is slowly acidified, at the boil, with acetic acid. The precipitate initially formed goes into solution as tetra-(aminomethyl) metal-free phthalocyanine tetraacetate.

EXAMPLE 37

*Tri-(aminomethyl) chloro copper phthalocyanine trihydrochloride*

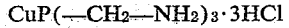

One part of tri-(o-carboxybenzamidomethyl) monochloro copper phthalocyanine, obtainable from tri-(phthalimidomethyl) chloro copper phthalocyanine by the method of Example 29 is dissolved in dilute sodium hydroxide solution and the solution is heated to boiling. The solution is slowly acidified at the boil with dilute hydrochloric acid, producing a solution of tri-(aminomethyl) monochloro copper phthalocyanine trihydrochloride.

EXAMPLE 38

*Tri-(aminomethyl) cobalt phthalocyanine trihydrochloride*

One part of tri-(o-carboxybenzamidomethyl) cobalt phthalocyanine, obtainable from tri-(phthalimidomethyl) cobalt phthalocyanine by the method of Example 29 is dissolved in dilute sodium hydroxide solution, and the solution is heated to boiling. It is slowly acidified at the boil with dilute hydrochloric acid, giving a solution of tri-(aminomethyl) cobalt phthalocyanine trihydrochloride.

EXAMPLES 39–46

*Tetra-(aminomethyl) copper phthalocyanine monosulfonic acid tetrahydrochloride*

The product of Example 18 is dissolved in dilute sodium hydroxide and hydrochloric acid is added slowly at the boil until the mixture is acid. The precipitate which first appears redissolves when the mixture is boiled. By the addition of large quantities of hydrochloric acid to the cool solution, tetra-(aminomethyl) copper phthalocyanine monosulfonic acid tetrahydrochloride is precipitated and can be isolated. Similar treatment of the product of Example 20 produces tri-(aminomethyl)) tetrachloro copper phthalocyanine monosulfonic acid tetrahydrochloride. Similarly, hydrolysis of the product of Example 22 produces tetra-(aminomethyl) copper phthalocyanine tetrasulfonic acid tetra-hydrochloride; the product of Example 21 produces tetra-(aminomethyl) monochloro copper phthalocyanine monosulfonic acid tetrahydrochloride, and the product of Example 24 produces di-(aminomethyl) copper phthalocyanine disulfonic acid dihydrochloride. The products of Examples 19 and 23 produce tetra-(aminomethyl) copper phthalocyanine disulfonic acid tetrahydrochloride on hydrolysis by this method. The tetra-(beta-carboxypropionamidomethyl) copper phthalocyanine of Example 26 on similar hydrolysis produces the same tetra-(aminomethyl) copper phthalocyanine monosulfonic acid tetrahydrochloride as described above.

EXAMPLE 47

*Dyeings with aminomethyl copper phthalocyanine sulfonic acids*

One part of each of the aminomethyl hydrochloride derivatives of phthalocyanine sulfonic acids described in Examples 39–46 are dissolved in 100 parts of water and the solution is buffered to a pH of approximately 5 by the addition of sodium acetate. The solutions, heated to approximately 90° C., are then used to dye textile fibers (cotton, rayon, silk, acetate, wool, polyamide and acrylic fibers) with the following results:

| Phthalocyanine | No. of —CH$_2$NH$_2$ Groups | No. of —SO$_3$H Groups | Shade |
|---|---|---|---|
| 1. Copper phthalocyanine | 4 | 1 | Brilliant greenish-blue. |
| 2. Tetrachloro copper phthalocyanine. | 3 | 1 | Green Blue (Greener than 1). |
| 3. Monochloro copper phthalocyanine. | 4 | 1 | Redder than 2. |
| 4. Copper phthalocyanine | 4 | 4 | Greener than 1 with more tendency to wash out. |
| 5. Cobalt phthalocyanine | 3 | 2 | Greenish-blue. |
| 6. Nickel phthalocyanine | 4 | 2 | Greener than 5. |
| 7. Copper phthalocyanine | 2 | 2 | Green blue less substantive than 1. |

The dyeings all showed good lightfastness and good washfastness compared to dyeings made from the disulfonic acid derivatives of copper phthalocyanine blue.

EXAMPLE 48

One part of tetra-(aminomethyl) copper phthalocyanine is dissolved in 10,000 parts of dilute hydrochloric acid. Sodium acetate is added to give a buffered solution having a pH of 5. Textile fibers such as cotton, silk, wool, viscose rayon, cellulose acetate, superpolyamide, dry spun polyacrylonitrile fiber and thiocyanate wet spun polyacrylonitrile fiber are added and the solution is boiled for a short time. The textile fibers are removed, rinsed, soaped, and rinsed again. The fibers are dyed a brilliant blue color which is fast to crocking, fast to washing and fast to light.

EXAMPLE 49

One part of octa-(o-carboxybenzamidomethyl) copper phthalocyanine [containing some octa-(phthalimidomethyl) copper phthalocyanine] is dissolved in 70 parts of 2 normal sodium hydroxide and the solution is boiled until the hydrolysis is complete. The mixture is then gradually acidified at the boil with dilute hydrochloric acid and the resultant solution of octa-(aminomethyl) copper phthalocyanine octahydrochloride is buffered and used to dye textile fibers as in Example 48. The resulting dyeings are bright greenish blues.

EXAMPLE 50

One part of tetra-(o-carboxybenzamidomethyl) metal-free phthalocyanine is dissolved in 50 parts of 2 normal sodium hydroxide. The solution is boiled until the hydrolysis is complete and then gradually acidified at the boil with hydrochloric acid. The solution of the hydrochloride of tetra-(aminomethyl) metal-free phthalocyanine, which is formed, is buffered and used to dye textiles as in Example 48. The dyeings are greenish blues which are somewhat greener than those obtained from the corresponding tetra-(aminomethyl) copper phthalocyanine.

EXAMPLE 51

One part of tri-(o-carboxybenzamidomethyl) monochlor copper phthalocyanine is dissolved in 70 parts of dilute sodium hydroxide solution and the mixture is boiled until the hydrolysis is complete. After the reaction mixture is gradually acidified at the boil with dilute hydrochloric acid, the resultant solution is buffered and used to dye textiles as in Example 48. The dyeings are bright greenish blues.

EXAMPLE 52

9 parts of an 11% aqueous paste of tetra-(aminomethyl) copper phthalocyanine tetrahydrochloride is dissolved in 500 parts of 1% acetic acid solution. A piece of a thiocyanate wet spun polyacrylonitrile fiber weighing 50 parts is placed in the dyebath, which is heated to 90–95° C. for one hour. The fabric is then removed, rinsed, and dried. A bright blue dyeing of good properties is obtained.

EXAMPLE 53

A print paste is prepared by stirring 10 parts of tetra-(o-carboxybenzamidomethyl) copper phthalocyanine into 10 parts of thiodiethylene glycol, 10 parts of thiourea and 1 part of 30° Bé. sodium hydroxide solution. The mixture is heated to effect complete solution and is then stirred into 60 parts of 5% carboxymethyl cellulose gum. Nine parts of water are added and the mixture is thoroughly stirred. The paste is used to print cotton. The printed fabric is dried at 71° C. and aged in a neutral atmosphere at atmospheric pressure. The finished print is rinsed and soaped three minutes at 71° C. to give a bright green blue print.

EXAMPLE 54

A print paste is prepared by stirring 2 parts of tetra-(aminomethyl) copper phthalocyanine tetrahydrochloride and 23 parts of hot water, 5 parts of urea in 5 parts of diethylene glycol. After warming to effect complete solution, the mixture is stirred into 60 parts of 6% gum tragacanth paste. The paste is used to print cotton. The printed fabric is dried at 71° C. and then aged with steam in a neutral atmosphere at atmospheric pressure. The finished print is rinsed and soaped three minutes at 71° C. to give a bright green-blue print, fast to light and crocking.

EXAMPLE 55

A dyebath is prepared by dissolving one part of tetra-(o-carboxybenzamidomethyl) copper phthalocyanine in 50 parts of a solution containing 0.2 part of sodium hydroxide in water. 0.5 part of stearamidopropyl trimethyl ammonium hydroxide is added. Cotton yarn weighing ten parts is added and the mixture is stirred for 20 minutes at 90° C. Three parts of sodium chloride is added and the stirring is continued for 10 minutes. The yarn is rinsed and dried. It is dyed a bright green blue.

EXAMPLE 56

A solution of one part of tetra-(o-carboxybenzamidomethyl) copper phthalocyanine on 0.5 part of sodium hydroxide and 49.5 parts of water is prepared. Glacial acetic acid is added to give a pH of approximately 6–6.5 followed by 10 parts of wool yarn. The mixture is boiled for 20 minutes. One part of sodium sulfate is added and the boiling is continued for 10 minutes. One part of sulfuric acid is then added and boiling is continued for 30 minutes. The yarn is rinsed and dried. It is dyed a bright green blue.

EXAMPLE 57

A dyebath is prepared by dissolving one part of tetra-(o-carboxybenzamidomethyl) copper phthalocyanine in a solution of 0.5 part of sodium hydroxide in 49.5 parts of water. The pH is adjusted to 6–6.5 with acetic acid. A skein of nylon (superpolyamide) from adiponitrile and tetramethylene diamine yarn weighing 10 parts is added and the mixture is stirred one hour at 90° C. The skein is rinsed and soaped one minute at 15° C. followed by further rinsing. It is dyed a bright green blue.

EXAMPLE 58

The procedure of Example 57 is followed, using a skein of Dacron (a superpolyester fiber) yarn in place of the nylon. A green blue dyeing is obtained.

EXAMPLE 59

Vattable phthalocyanine 30 parts of cobalt phthalocyanine, prepared by reacting phthalonitrile with cobaltous chloride in ethylene glycol at 180–195° C., is added with stirring to 410 parts of 97% sulfuric acid. The mass is heated slowly. When 65° C. is reached, 11.5 parts of methylolphthalimide is added carefully by dusting. The heating is continued to 95° C. and held at 95–100° C. for several hours. After cooling to below 50° C., the solution is drowned in 5000 parts of ice slush, and isolated by filtration and washing. On analysis, the product is found to consist of 54% o-carboxybenzamidomethyl cobalt phthalocyanine and 46% unsubstituted cobalt phthalocyanine. The resulting wet cake is compounded into a water-dispersible paste with the aid of 3 parts Tamol (naphthalene sulfonic acid formaldehyde condensate), 30 parts glycerine, 45 parts dextrine, 0.5 parts of a fungicide and sufficient water to give a final real dye content of about 10% based on cobalt analysis. One part of the above paste is diluted with 40 parts of water and reduced at 140° F. with sodium hydroxide and sodium hydrosulfite, each applied to the bath in conc. of 1 oz. per gal. Cotton, 12.5 to 50 parts, is added to the olive-green colored dyebath and held at 140° F. for 45 minutes. The dyeings are finished in the conventional maner by lifting, wringing, and rinsing, oxidizing with sodium bicarbonate-sodium perborate, soaping and drying. The dyeings are strong and bright blue in shade.

It is to be understood that in accordance with the present invention, an average of less than one imidomethyl or o-carboxyamidomethyl or aminomethyl substituent per molecule is possible and, therefore, the expressions "the average number of substituents per molecule is one" and "at least one," as used in the claims which follow, include such mixtures to the extent that substitution exists since obviously it is not possible to have a half substituent.

This application is in part a continuation of my application, Serial No. 234,470, filed June 29, 1951, now abandoned.

I claim:

1. A phthalocyanine compound having the formula:

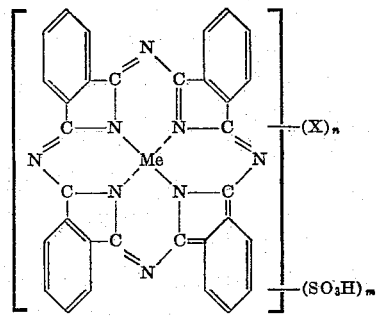

in which Me represents basic atoms selected from the group consisting of two atoms of hydrogen and one atom of a metal having a coordination number of 4–6, X is selected from the group consisting of —CH₂NH₂, —CH₂NHCORCOOH and

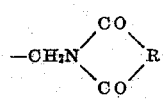

in which R is selected from the group consisting of ortho-phenylene and ethylene radicals, and $n$ and $m$ are integers, the sum of which is less than 9.

2. A phthalocyanine according to claim 1 in which $m$ is 0.

3. Fibers dyed with the dyes of claim 1.

4. Metallized phthalocyanines having at least one and not more than eight substituents of the formula:

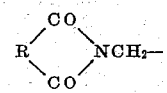

in which R is an ortho-phenylene radical.

5. Metallized phthalocyanines having at least one and not more than eight substituents of the formula:

in which R is an ortho-phenylene radical.

6. Copper phthalocyanine having at least one and not more than eight substituents of the formula:

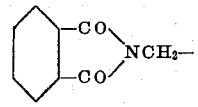

7. Copper phthalocyanine having at least one and not more than eight substituents of the formula:

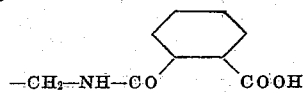

8. A product according to claim 7 in which the average number of substituents per molecule is one.

9. Metallized phthalocyanines having at least one and not more than eight aminomethyl substituent groupings of the formula:

10. Copper phthalocyanine having at least one and not more than eight aminomethyl substituent groupings of the formula:

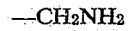

11. A phthalocyanine compound having the formula:

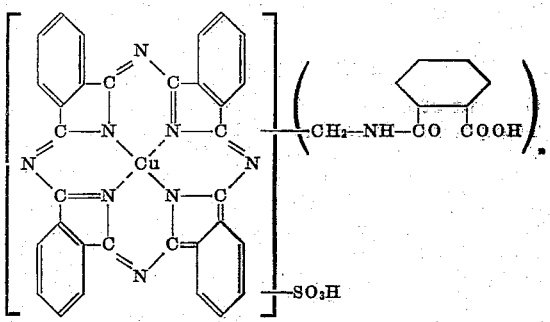

in which $n$ is an integer less than 8.

12. A phthalocyanine compound according to claim 11 in which $n$ is 4.

13. A phthalocyanine according to claim 12 in which at least one of the hydrogen atoms on the benzo groups is substituted by a chlorine atom.

14. A phthalocyanine compound having the formula:

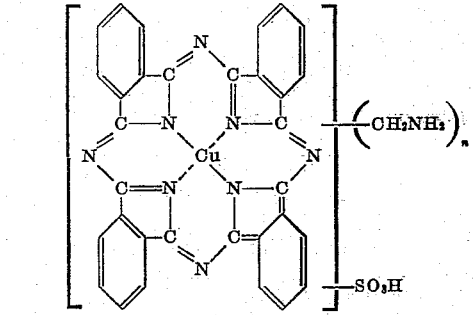

in which $n$ is an integer less than 8.

15. A phthalocyanine compound according to claim 14 in which $n$ is 4.

16. A process of preparing a compound according to claim 4 which comprises reacting a phthalocyanine at a temperature above about 40° C. in the presence of an acid dehydrating agent with a hydroxymethylimide of the formula:

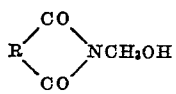

in which R is an ortho-phenylene radical.

17. A process of preparing a compound according to claim 4 which comprises reacting a phthalocyanine at a temperature above about 40° C. with concentrated sulfuric acid, paraformaldehyde and an imide of the formula:

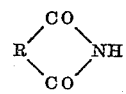

in which R is an ortho-phenylene radical.

References Cited in the file of this patent

UNITED STATES PATENTS 2,490,704     Paige _____ Dec. 6, 1949